United States Patent [19]
Kochis et al.

[11] Patent Number: 5,218,458
[45] Date of Patent: Jun. 8, 1993

[54] ASCII TO ASCII TRANSFER USING FAX PROTOCOL

[76] Inventors: Richard L. Kochis, 2217 Brixton Rd., Fort Collins, Colo. 80526; Martha A. Chavez-Simmons, 3401 Stratton Dr., Fort Collins, Colo. 80525

[21] Appl. No.: 606,250

[22] Filed: Oct. 31, 1990

[51] Int. Cl.$^5$ .......................................... H04M 11/00
[52] U.S. Cl. ................................................. 358/448
[58] Field of Search ...................... 358/448, 407, 434; 379/88, 100

[56] References Cited

U.S. PATENT DOCUMENTS

| | | |
|---|---|---|
| 2,189,115 | 3/1987 | Gelfer . |
| 4,996,707 | 2/1991 | O'Malley et al. ............ 379/100 |
| 5,048,078 | 9/1991 | Satomi et al. ............... 379/100 |
| 5,091,790 | 2/1992 | Silverberg .................. 358/434 |

OTHER PUBLICATIONS

1990 IEEE Region 10 Conference on Computer and Communication Systems, vol. 2, Sep. 1990, Hong Kong, pp. 644-648; Liu et al.: "Compound Document Transfer between Electronic-Mail Network and Facsimile Terminals" (the whole document).

System Integration, vol. 23, No. 2, Feb. 1990, Newton, MA, U.S. pp. 50-53 & 55; Kinnucan: "What's New in the Faxworld" (the whole document).

Primary Examiner—Stephen Brinich

[57] ABSTRACT

Disclosed is a system that transmits a data file between two computer systems using facsimile transmission. The file is converted into a FAX graphical image by the transmitting system, then transmitted using a standard CCITT FAX protocol, and converted back to an ASCII format in the receiving computer system using optical character recognition (OCR). A significant advantage of this system is that it avoids the requirement that the two FAX facilities be capable of directly transmitting an ASCII file. Instead, the two FAX facilities need only be capable of using the CCITT standard FAX protocol. Another advantage is the elimination of the noise induced by the printing and re-scanning of the file during file transfer.

15 Claims, 7 Drawing Sheets

ASCII TO ASCII TRANSFER USING FAX PROTOCOL

FIELD OF THE INVENTION

This invention relates to computer systems and more particularly to transferring files between such systems. Even more particularly, the invention relates to transferring files between computer systems by using a FAX graphical image as the transfer format.

BACKGROUND OF THE INVENTION

In small or personal computer systems, facsimile transmission capability is increasingly being built into or attached to the computer system. These systems sometimes have the ability to transfer files from one computer system to another, through a software program running in the computer system, however, they can transfer a file only if the two computer systems have compatible facsimile receiving facilities which allow file transfers using the non-standard facility of the CCITT FAX protocol.

If the two facsimile systems cannot use the non-standard facility, they cannot transfer a file directly. A file can be transferred, however, by having the transmitting system convert the file to a FAX graphical image, and transmit the image to the receiving FAX where it is printed. Then the printed image is scanned, by a separate scanner, and converted to an ASCII file using optical character recognition (OCR). This method suffers from noise introduced by the printing process, and some optical character recognition systems cannot accurately scan a FAX printout. This method is more limited if the original file is printed before being FAXed, since the FAX transmitter introduces additional noise when the paper is scanned for transmission.

There is a need in the art then for a system to transfer an ASCII file using FAX systems. There is further need for such a system that uses facsimile transmission capability available on local and remote computer systems. A still further need is for such a system that transmits the data in a FAX image format and performs OCR conversion when receiving the file. The present invention meets these needs.

SUMMARY OF THE INVENTION

It is an aspect of the present invention to transfer a data file from one computer system to another.

It is another aspect of the invention to convert a file received in a FAX graphical image into an ASCII format.

It is another aspect of the invention to convert data being transferred into a FAX graphical image, transfer the data, and convert the data back to a standard computer format, such as ASCII, using optical character recognition.

Another aspect of the invention is to transfer the data using a standard CCITT FAX protocol.

A further aspect is to reduce noise introduced by printing to paper when receiving FAX data.

A further aspect of the invention is to reduce noise when transmitting data by converting the data directly from an ASCII format to a FAX graphical image.

The above and other aspects of the invention are accomplished in a system that transmits a data file between two computer systems using facsimile transmission. The file is converted into a FAX graphical image by the transmitting system, then transmitted using a standard CCITT FAX protocol, and converted back to an ASCII format in the receiving computer system using optical character recognition (OCR). A significant advantage of this system is that it avoids the requirement that the two FAX facilities be capable of directly transmitting an ASCII file. Instead, the two FAX facilities need only be capable of using the CCITT standard FAX protocol.

The FAX facility may also be provided in the computer systems by a Multi-Functional Peripheral Device which is capable of receiving and printing FAX data while sharing a printer with the computer system. The Multi-Functional Peripheral Device also has a scanner for scanning printed data, and the OCR capability of the scanner is utilized for the OCR conversion of the received FAX image.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
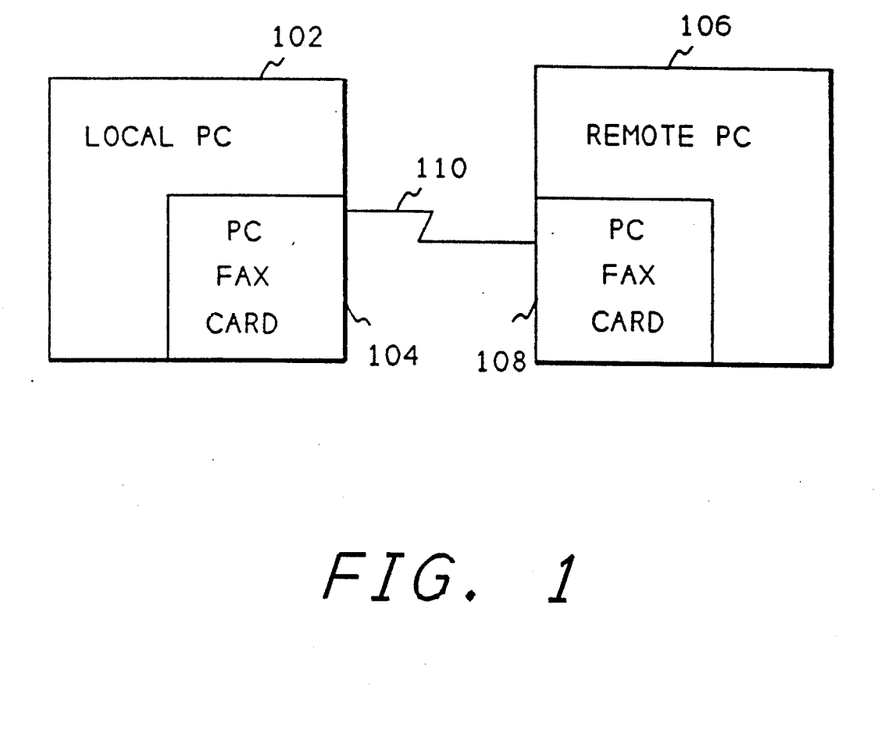
FIG. 1 shows a block diagram of the concepts of the system of the present invention.

FIG. 1 shows a block diagram depicting the concept of the present invention and its environment. Referring now to FIG. 1, a local PC system 102 having a PC FAX card 104 is connected over a telephone line 110 to a PC FAX card 108 in a remote PC system 106. The system 102 sends data to the FAX card 104 where the data is converted to a FAX graphical image. The FAX card 104 then sends the graphical image over the telephone line 110 to the FAX card 106 in the remote PC 106 which stores the data in the remote PC 106. Software in the remote PC 106 converts the FAX graphical image back to an ASCII file using optical character recognition (OCR).

Figure 2:
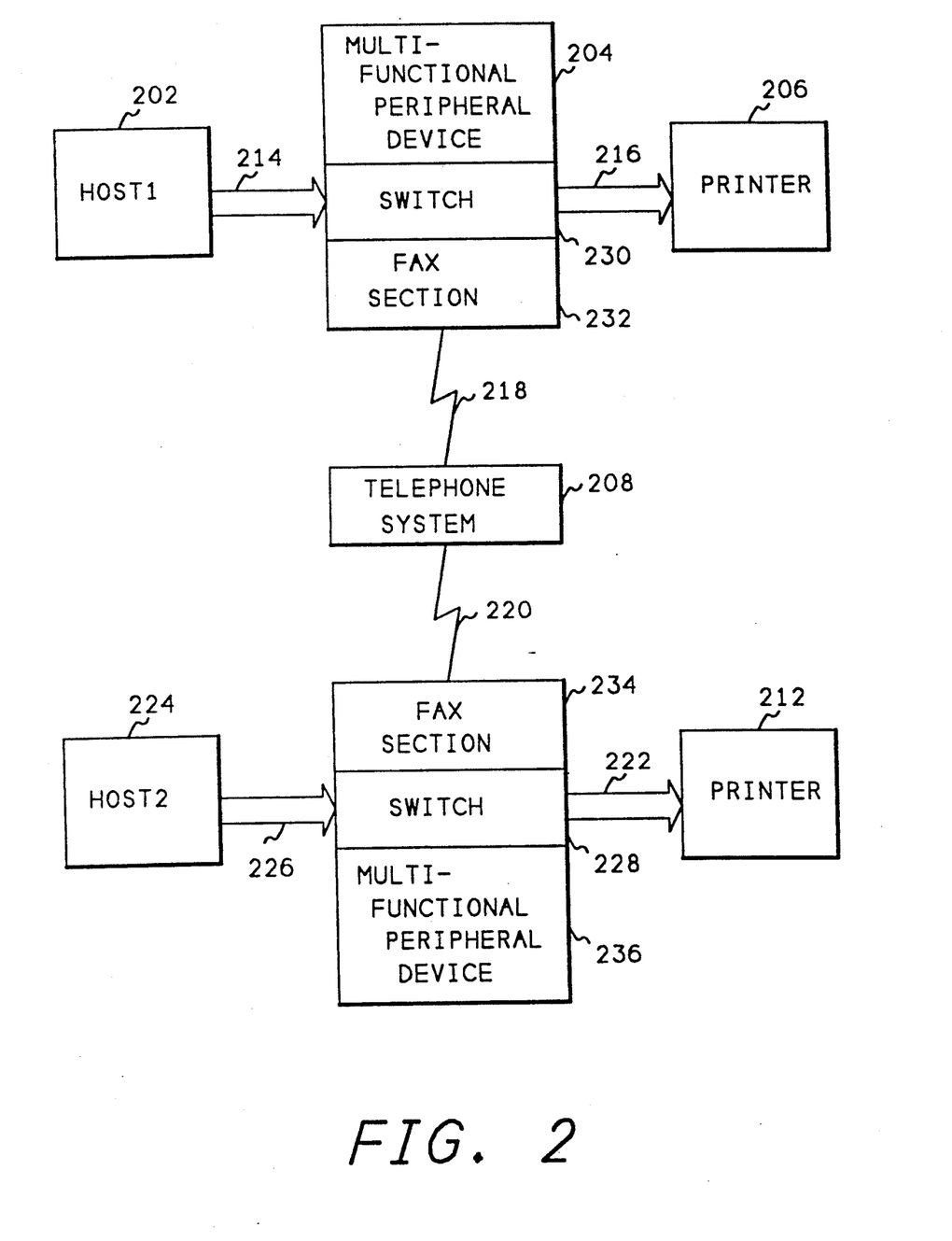
FIG. 2 shows a block diagram of the system of the present invention being used to transfer data to a remote system by using a FAX section of a Multi-Function Peripheral Device.

FIG. 2 shows a block diagram wherein the present invention uses a pair of Multi-Functional Peripheral Devices to transfer a file. Referring now to FIG. 2, a host system 202 is connected via a bus 214 to a local Multi-Functional Peripheral Device 204 which contains a switch 230 and a FAX section 232. A remote Multi-Functional Peripheral Device 236 is connected via wires 220 to a telephone system 208. The telephone system 208 is connected via wires 218 to the FAX section 232 of the local Multi-Functional Peripheral Device 204. The switch 230 is also connected via a bus 216 to a local printer 206. The switch 230 allows the host system 202 to share the printer 206 with the FAX section 232. A remote FAX section 234, within the remote Multi-Functional Peripheral Device 236, performs the same function as the local FAX section 232. The FAX section 232 calls the FAX section 234 when the host system 202 sends a file transfer command over the bus 214. When the remote FAX section 234 receives a call from the local FAX section 232, it connects to the remote host 224. When the host system 202 sends data to the Multi-Functional Peripheral Device 204, the data is routed to the FAX section 232 which converts it to a graphical image and sends it to the remote FAX section 234. The remote FAX section 234 then sends the data to the Multi-Functional Peripheral Device 236. The Multi-Functional Peripheral Device 236 converts the graphical image, using OCR techniques, into an ASCII file and transfers the ASCII file to the host 224.

Switch 228 within the remote Multi-Functional Peripheral Device 236, and switch 230 in the Local Multi-Functional Peripheral Device 204 monitor all commands sent from the host systems 224 and 202 to the printers 212 and 206 in order to keep a copy of the printer state within RAM contained in the device 236. Therefore, after a FAX is printed on the printer, the switches 228 and 230 use their respective copies of the printer state to place the printer back into the state expected by the host systems 224 and 202. Thus the Multi-Functional Peripheral Device allows the printer to be shared between normal FAX printing and host system printing, as well as providing for ASCII file transfer.

Figure 3:
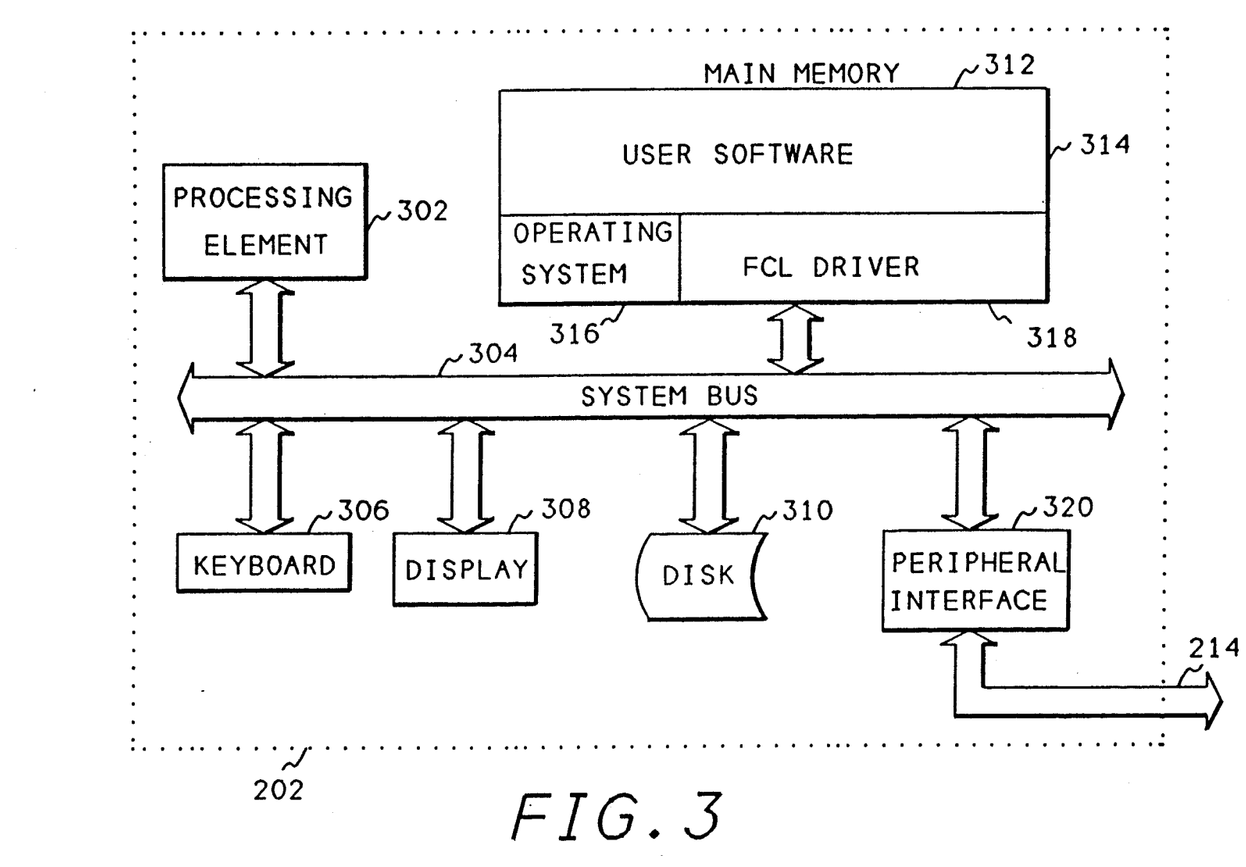
FIG. 3 shows a block diagram of the host computer system of FIG. 2.

FIG. 3 shows a block diagram of the host computer system 202 of FIG. 2, which is typical of host computer systems. The only requirement of a host system is that it have a bi-directional parallel or serial interface to a printer. Referring now to FIG. 3, the host system 202 contains a processor 302 which is connected to the other components of the system over a system bus 304. A keyboard 306 allows a user of the host system 202 to enter information into the system. A display 308 allows information to be presented to the user of the host system 202. A disk 310 is used to store software and data for the host system 202 and a peripheral interface 320 is used to communicate over a bus 214 to the Multi-Functional Peripheral Device 204 containing the system of the present invention. The peripheral interface 320 may be a serial interface such as RS/232, or a parallel interface such as the Bi-Centronics parallel printer interface.

A memory 312 contains user software 314 and an operating system 316. A FAX Command Language (FCL) driver module 318 is used by the user software 314 to control all FAX functions within the Multi-Functional Peripheral Device 204 including file transfer.

Figure 4:
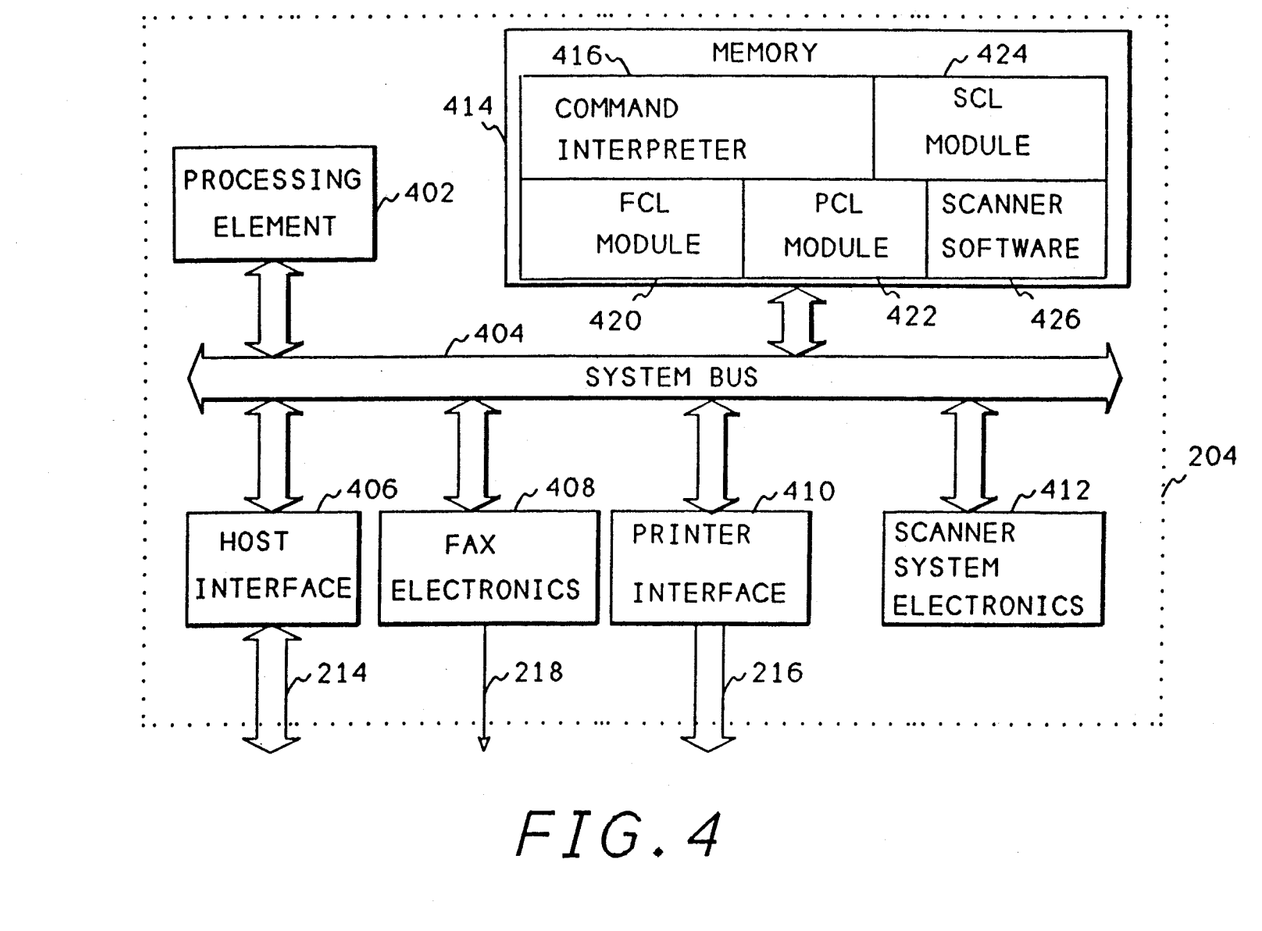
FIG. 4 shows a block diagram of the Multi-Functional Peripheral Device of FIG. 2, which includes the present invention.

FIG. 4 shows a block diagram of the Multi-Functional Peripheral Device 204, which contains the system of the present invention. Referring now to FIG. 4, the Multi-Functional Peripheral Device 204 contains a processor 402 which communicates to other elements of the system over a system bus 404. A bi-directional host system interface 406 is used to communicate with the host system 202 over the bus 214. FAX electronics 408 are used to communicate to the remote FAX section 234 (FIG. 2) via the telephone system 208 (FIG. 2) over the bus 218. A printer interface 410 is used to send data to the printer 206 over the bus 216. Scanner system electronics 412 are used with a data scanning device which may also be part of the Multi-Functional Peripheral Device 204. A memory 414 contains a command interpreter 416 which routes PCL, FCL, and SCL commands from the host system to the PCL (422), FCL (420), and SCL (424) modules of FIG. 4. The PCL, FCL, and SCL modules within the Multi-Functional Peripheral Device 204 control the printer interface 410, the FAX electronics 408 and the scanner system electronics 412, respectively. The command interpreter 416 will be described below with respect to FIGS. 5 and 6. An FCL module 420 is used to process commands sent by the FCL driver module 318 (FIG. 3) in order to perform FAX related functions, including receiving and sending data files and printing FAX messages on the shared printer 206. The FCL module 420 sends commands and status to the command interpreter 416 which processes those commands and sends them to the host system 202. The FCL module 420, when receiving a FAX, also sends data directly to a PCL module 422. The PCL module 422 receives commands and data from the command interpreter and the FCL module 420, and passes those commands through the printer interface 410 to the printer 206 (FIG. 2). An SCL module 424 receives scanner command language commands from the host system and passes those commands to scanner system software 426 which interfaces to the scanner system electronics 412.

Figure 5:
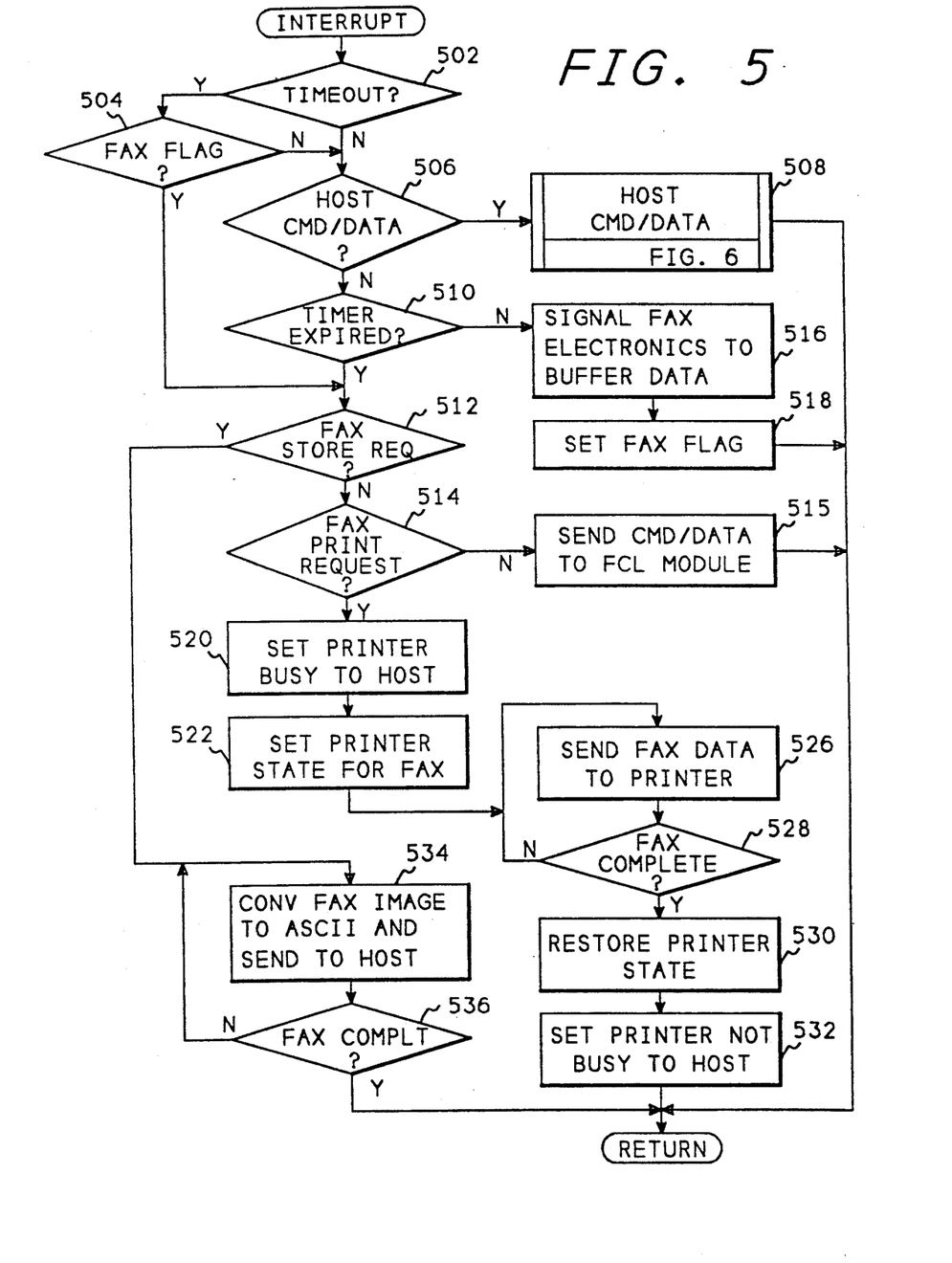
FIG. 5 shows a flowchart of the top level of the software of the Multi-Functional Peripheral Device.
Figure 6:
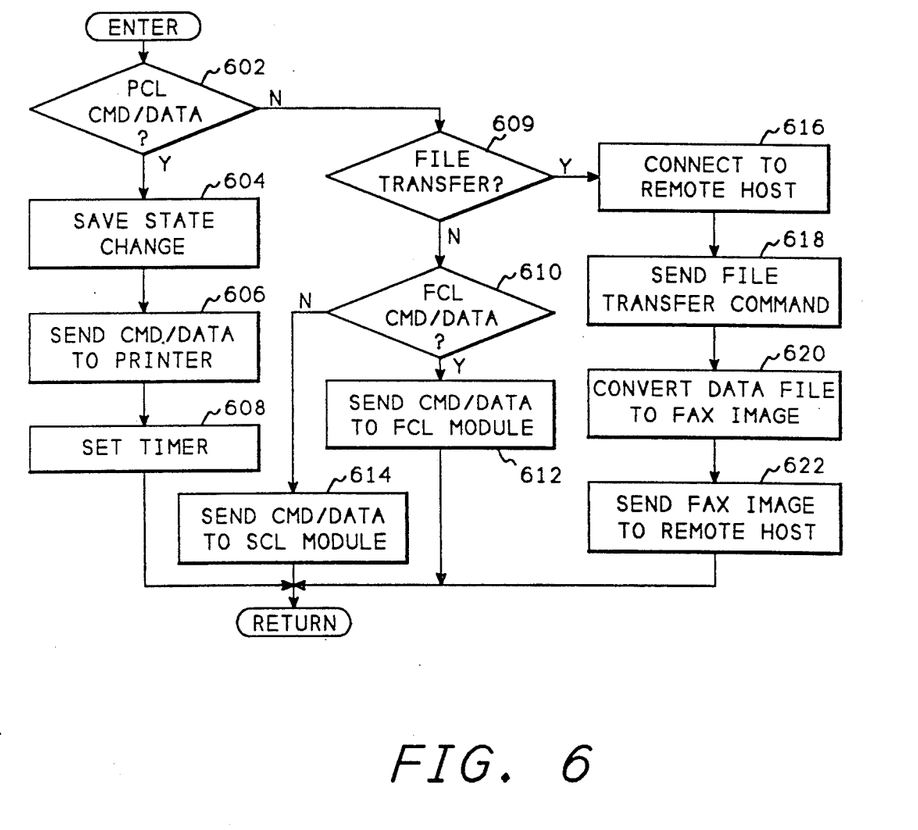
FIG. 6 shows a flowchart of the host data/command processing software of the Multi-Functional Peripheral Device.

FIGS. 5 and 6 show flowcharts of the software of the command interpreter 416 of FIG. 4. This software is used to perform the file transfer, FAX printing, and switch functions of the present invention, in conjunction with hardware described by the block diagram of FIG. 4. Referring now to FIGS. 5 and 6, this flowchart is entered when an interrupt occurs. The interrupt indicates that a command or data has arrived from either the host system or the FAX section of the Multi-Functional Peripheral Device. After entry, block 502 determines whether a timeout has occurred. A timeout will occur when the host system has completed using the printer. If a timeout has occurred, block 502 transfers to block 504 which determines if a FAX is waiting to print or a file is waiting to be transferred to the host. If the FAX is waiting, block 504 transfers control to block 512 to start the FAX operation, otherwise, block 504 transfers to block 506. Block 506 determines whether data or commands have been received from the host over the host interface 406. If data or a command has been received from the host, block 506 transfers to block 508 which calls FIG. 6 to process the data or command from the host before returning from the interrupt.

If a command or data has not been received from the host, block 506 transfers to block 510 which determines if time has expired on the timer. If time has not expired, the host is still printing, so block 510 transfers to block 516 which signals the FAX electronics 408 to buffer the incoming FAX data. Then block 518 sets the FAX flag to indicate that the FAX is waiting to perform either a print or a file transfer. If the timer has expired, block 510 transfers to block 512, which determines whether the FAX electronics has received a FAX store request, indicating that a remote system is transferring a file. If a FAX store request has been received, block 512 transfers to block 534 which receives the FAX image from the FAX electronics, converts the image into ASCII data using OCR techniques, and sends the ASCII data to the host. Block 536 then determines if all FAX data has been received, and loops back to block 534 if more FAX data is available. If all FAX data has been received, block 536 returns from the interrupt.

If a FAX store request was not received, block 512 transfers to block 514 which determines whether a print request has been received from the FAX section of the Multi-Functional Peripheral Device. If a FAX print request has not been received, then a command or data has been received from the FAX section, so block 512 transfers to block 515 to send the command or data to the FCL module for processing. If a FAX print request has been received from the FAX section, block 514 transfers to block 520 which sets a busy signal in interface 214 to indicate to the host that the printer is busy. Block 522 sends commands to the printer to set the printer state to allow a FAX print, and block 526 sends the first FAX data to the printer. Block 528 determines if all FAX data has been sent, and if not, block 528 transfers back to block 526 to send more data. After all FAX data has been sent, block 528 transfers to block 530 which sends commands to the printer to restore the printer state, and then block 532 removes the busy signal from interface 214 before returning from the interrupt.

FIG. 6 shows a flowchart of the host data command processing module called by block 508 (FIG. 5). Referring now to FIG. 6, after entry, block 602 determines whether printer command language commands or data were received. If not, block 602 transfers to block 609 which determines if a file transfer command was received. If a file transfer command was received, block 609 transfers to block 616 which connects to the remote host using the telephone number in the file transfer command. After connecting to the remote host, block 618 sends a remote file transfer command which tells the remote FAX receiver to convert the FAX image and store it on the remote host. Block 620 then converts the data file into a FAX image, and block 622 sends the FAX image to the remote host. Table 2 shows an example of a remote file transfer command, where "file name" represents the name to be used when storing the file on the remote host.

If a file transfer command was not received from the host, block 609 transfers to block 610 which determines whether FAX command language commands or data were received. If FAX command language commands or data were received from the host, block 610 transfers to block 612 which sends the command or data to the FCL module for processing.

If FCL command/data information was not received, the system assumes that the command/data is for the SCL module, and control goes to block 614 to send the command or data to the SCL module for processing.

If PCL commands or data were received, block 602 transfers to block 604 which saves any change in the printer state in a buffer. Block 606 then sends the commands or data to the PCL module for processing, and block 608 sets a timer indicating that the host is using the printer. This timer is always set to a new value when new commands or data are received for the printer. Therefore, after the host has completed using the printer, the timer will time for a full five to ten seconds before the FAX will be allowed to use the printer. This provides sufficient time for the host to readdress the printer if more printing is to be done.

After setting the timer value, or after sending commands or data to the FCL or SCl modules, FIG. 6 returns to FIG. 5.

The state information for a printer includes print resolution, such as 300 dots per inch; page orientation, such as portrait or landscape; paper margins; selected fonts; and page size. Other parameters may also be included in the printer state depending upon the type of printer being used. Different state information might be needed for other peripheral devices. For example, a disk would have selected read/write head and current cylinder as state information.

Figure 7:
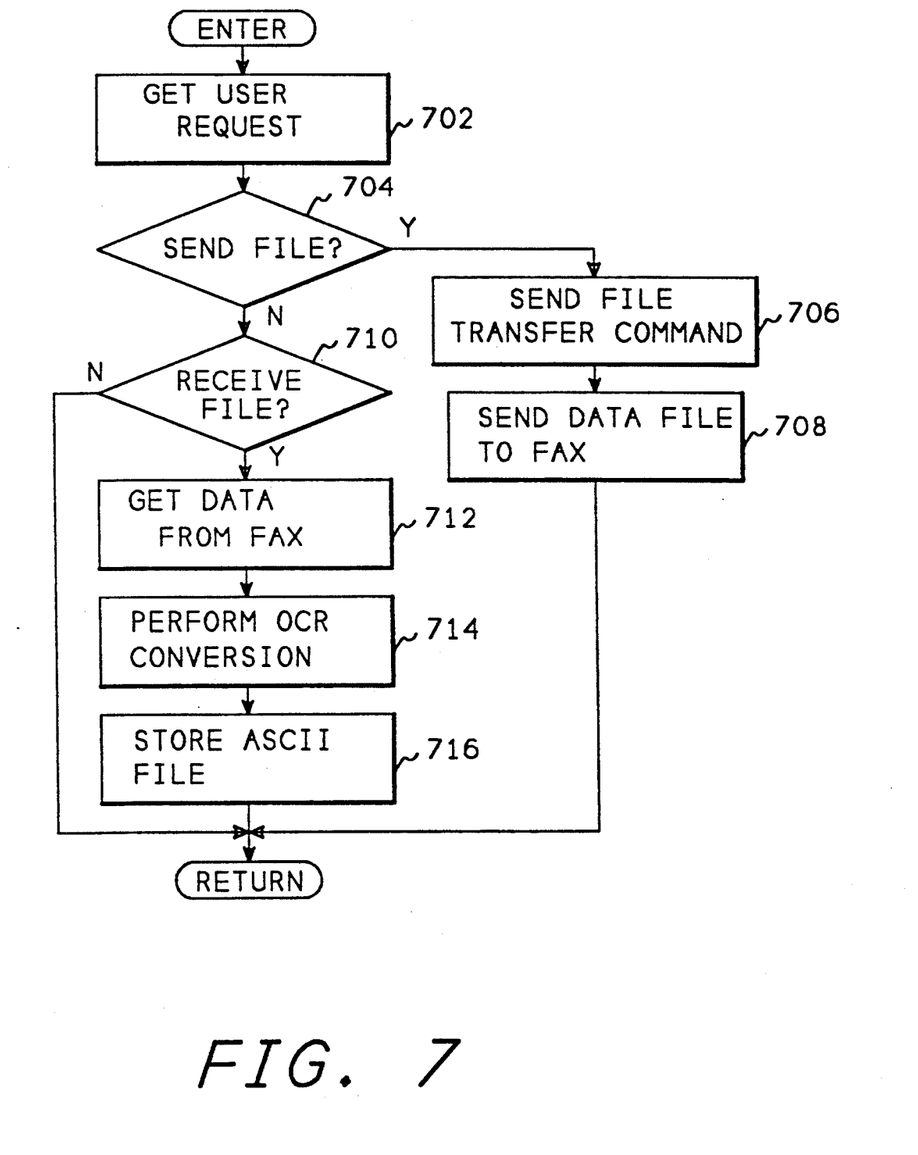
FIG. 7 shows a flowchart of the host software used for sending and receiving files.

FIG. 7 shows a flowchart of the user software 314 (FIG. 3), which is used in the host system for file transfers. Referring now to FIG. 7, after entry, block 702 gets the user request. If the user request is to send a file, block 704 transfers to block 706 which sends a file transfer command to either the PC FAX card (as shown in FIG. 1) or the FAX section of the Multi-Functional Peripheral Device (as shows in FIG. 2). An example of a file transfer command is shown in Table 1, where 9999999999 represents the telephone number of the remote host, and "file name" represents the file name to be used in storing the file on the remote host. Block 708 then sends the data from the file to the FAX card or FAX section. After sending the file, the software returns to the operating system.

If the user request is not a send file request, block 704 transfers to block 710 which determines if the request is to receive a file. If the request is not to receive a file, block 710 returns to the operating system. If the request is to receive a file, block 710 transfers to block 712 which receives either the FAX graphical image, from the PC FAX card, or the ASCII data from the FAX section of the Multi-Function Peripheral Device. If the data received was a graphical image, block 714 converts this image into an ASCII file using OCR techniques. If the data received is already in ASCII format, block 714 is skipped. Block 716 then stores the file on the disk 310 of the host computer system before returning to the operating system.

The software of FIG. 7 could continuously reside in the host computer system to allow it to send or receive files at any time.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

TABLE 1

| File Transfer Command |
|---|
| Esc*{5i9999999999"file name"J<cr> |

TABLE 2

| Remote File Transfer Command |
| --- |
| Esc*{5i"file name"J<cr> |

What is claimed is:

1. A system for transferring a data file from a first computer system to a second computer system comprising:
- a FAX transmitting facility connected to the first computer system;
- a FAX receiving facility connected to the second computer system;
- means for connecting said FAX transmitting facility to said FAX receiving facility;
- means for directing said FAX transmitting facility to convert the data file received from the first computer system into a FAX graphical image and send said FAX graphical image to said FAX receiving facility; and
- means for directing said FAX receiving facility to send said FAX graphical image received from said FAX transmitting facility to the second computer system, said means for directing said FAX receiving facility comprising a remote file transfer command sent to said FAX receiving facility by said FAX transmitting facility; and
- means located in said second computer system for receiving and converting said FAX graphical image into an ASCII data file.

2. The system of claim 1 wherein said means for directing said FAX transmitting facility comprises a file transfer command preceding the data file.

3. The system of claim 1 wherein said FAX transmitting facility and said FAX receiving facility further comprise means for using a CCITT Group 3 FAX protocol to transfer the data file from said FAX transmitting facility to said FAX receiving facility.

4. The system of claim 1 wherein said means for connecting said FAX transmitting facility to said FAX receiving facility comprises telephone dialing means.

5. A system for transferring a data file from a local computer system to a remote computer system comprising:
- a first switch, having a FAX transmitting facility, attached to and peripheral to the local computer system;
- a second switch, having a FAX receiving facility, attached to and peripheral to the remote computer system;
- means for connecting said FAX transmitting facility in said first switch to said FAX receiving facility;
- means for directing said FAX transmitting facility in said first switch to convert the data file received from the local computer system into a FAX graphical image and send said FAX graphical image to said FAX receiving facility in said second switch; and
- means for direction said FAX receiving facility in said second switch, by said FAX transmitting facility, to convert said FAX graphical image into a data file having a computer data format and send said data file to the remote computer system.

6. The system of claim 5 wherein said means for directing said FAX transmitting facility comprises a file transfer command preceding the data file.

7. The system of claim 5 wherein said means for directing said FAX receiving facility comprises a remote file transfer command sent to said FAX receiving facility by said FAX transmitting facility.

8. The system of claim 5 wherein said FAX transmitting facility and said FAX receiving facility further comprise means for using a CCITT Group 3 FAX protocol to transfer the data file from the FAX transmitting facility to the FAX receiving facility.

9. The system of claim 5 wherein said first and second switches further comprise means for sharing a printer with the first and second computer systems.

10. The system of claim 5 wherein said means for connecting said FAX transmitting facility to said FAX receiving facility comprises telephone dialing means.

11. The system of claim 7 further comprising a printer connected to said second switch;
- wherein said second switch further comprises means for sharing said printer with said second computer system; and
- wherein said second switch sends said FAX graphical image to said printer if said file transfer command is not sent to said FAX receiving facility by said FAX transmitting facility.

12. A method for transferring a data file from a first computer system to a second computer system comprising the steps of:
 (a) connecting the first computer system to a FAX transmitting facility;
 (b) connecting the second computer system to a FAX receiving facility;
 (c) connecting said FAX transmitting facility to said FAX receiving facility;
 (d) sending a FAX store request to said FAX receiving facility;
 (e) converting the data filer received from said first computer system into a FAX graphical image;
 (f) sending said FAX graphical image to said FAX receiving facility;
 (g) converting said FAX graphical image into a computer data file if said FAX store request is sent to said FAX receiving facility; and
 (h) sending said computer data file to said second computer system if said FAX store request is sent to said FAX receiving facility.

13. The method of claim 12 further comprising the step of sending the FAX graphical image using a CCITT Group 3 FAX protocol.

14. The method of claim 12 wherein step (c) further comprises the step of sending a file transfer command to said FAX transmitting facility prior to said connecting.

15. The method of claim 12 wherein step (c) further comprises the step of connecting through a telephone switching system.

* * * * *